US011943679B2

(12) United States Patent
Mayor et al.

(10) Patent No.: US 11,943,679 B2
(45) Date of Patent: *Mar. 26, 2024

(54) MOBILE DEVICE NAVIGATION SYSTEM

(71) Applicant: Apple Inc., Cupertino, CA (US)

(72) Inventors: Robert William Mayor, Half Moon Bay, CA (US); Isaac T. Miller, Half Moon Bay, CA (US); Adam S. Howell, Oakland, CA (US); Vinay R. Majjigi, Mountain View, CA (US); Oliver Ruepp, Mountain View, CA (US); Daniel Ulbricht, Sunnyvale, CA (US); Oleg Naroditsky, San Francisco, CA (US); Christian Lipski, Cupertino, CA (US); Sean P. Cier, Seattle, WA (US); Hyojoon Bae, San Jose, CA (US); Saurabh Godha, Santa Clara, CA (US); Patrick J. Coleman, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,167

(22) Filed: Jul. 8, 2022

(65) Prior Publication Data

US 2022/0345849 A1    Oct. 27, 2022

Related U.S. Application Data

(63) Continuation of application No. 16/576,573, filed on Sep. 19, 2019, now Pat. No. 11,412,350.

(51) Int. Cl.
*H04W 4/024* (2018.01)
*G01C 21/36* (2006.01)
(Continued)

(52) U.S. Cl.
CPC ........ *H04W 4/024* (2018.02); *G01C 21/3647* (2013.01); *G06T 7/74* (2017.01);
(Continued)

(58) Field of Classification Search
CPC ....... H04W 4/00–029; H04W 4/18–20; H04W 4/30; H04W 88/00–06; H04W 4/33;
(Continued)

(56) References Cited

U.S. PATENT DOCUMENTS

| 7,428,461 B2 | 9/2008 | Ohnishi et al. |
| 7,539,576 B2 | 5/2009 | Ohnishi et al. |

(Continued)

FOREIGN PATENT DOCUMENTS

| CN | 102884398 A | 1/2013 |
| CN | 105676253 A | 6/2016 |

(Continued)

OTHER PUBLICATIONS

U.S. Appl. No. 16/576,573, Advisory Action, dated Jan. 19, 2021, 3 pages.

(Continued)

*Primary Examiner* — San Htun
(74) *Attorney, Agent, or Firm* — Kilpatrick Townsend & Stockton LLP

(57) ABSTRACT

Location mapping and navigation user interfaces may be generated and presented via mobile computing devices. A mobile device may detect its location and orientation using internal systems, and may capture image data using a device camera. The mobile device also may retrieve map information from a map server corresponding to the current location of the device. Using the image data captured at the device, the current location data, and the corresponding local map information, the mobile device may determine or update a current orientation reading for the device. Location errors (Continued)

and updated location data also may be determined for the device, and a map user interface may be generated and displayed on the mobile device using the updated device orientation and/or location data.

14 Claims, 8 Drawing Sheets

(51) Int. Cl.
| | | |
|---|---|---|
| *G06T 7/73* | (2017.01) | |
| *G06V 10/44* | (2022.01) | |
| *G06V 10/80* | (2022.01) | |
| *G06V 20/10* | (2022.01) | |
| *H04M 1/724* | (2021.01) | |
| *H04W 4/02* | (2018.01) | |
| *H04W 64/00* | (2009.01) | |

(52) U.S. Cl.
CPC ............ *G06V 10/44* (2022.01); *G06V 10/806* (2022.01); *G06V 20/10* (2022.01); *H04M 1/724* (2021.01); *H04W 4/026* (2013.01); *G06T 2207/30244* (2013.01); *H04M 2250/52* (2013.01); *H04W 64/006* (2013.01)

(58) Field of Classification Search
CPC ... H04W 4/38; H04M 1/724; H04M 2250/52; G06T 7/74; G06T 2207/30244; G06V 20/10
See application file for complete search history.

(56) References Cited

U.S. PATENT DOCUMENTS

| | | | |
|---|---|---|---|
| 7,702,457 B2 | 4/2010 | Matsunaga et al. | |
| 8,810,599 B1 | 8/2014 | Tseng | |
| 8,890,896 B1 | 11/2014 | Tseng | |
| 9,121,714 B2 | 9/2015 | Janardhanan et al. | |
| 2010/0123737 A1 | 5/2010 | Williamson et al. | |
| 2010/0191459 A1* | 7/2010 | Carter ............... | H04N 1/00244 348/222.1 |
| 2010/0328344 A1 | 12/2010 | Mattila et al. | |
| 2011/0161875 A1* | 6/2011 | Kankainen ............ | G06F 3/0481 715/810 |
| 2011/0199479 A1* | 8/2011 | Waldman ............ | G01C 21/3679 701/533 |
| 2011/0310087 A1 | 12/2011 | Wright, Jr. et al. | |
| 2012/0176525 A1 | 7/2012 | Garin et al. | |
| 2012/0194547 A1 | 8/2012 | Johnson et al. | |
| 2013/0135344 A1 | 5/2013 | Stirbu et al. | |
| 2014/0015998 A1 | 1/2014 | Inoshita | |
| 2014/0016821 A1* | 1/2014 | Arth .......................... | G06T 7/80 382/103 |
| 2014/0080515 A1 | 3/2014 | Pakzad | |
| 2014/0244160 A1 | 8/2014 | Cragun et al. | |
| 2014/0323148 A1* | 10/2014 | Schmalstieg ......... | H04W 4/029 455/456.1 |
| 2017/0074675 A1 | 3/2017 | Waldman | |
| 2017/0154429 A1* | 6/2017 | Moteki .................... | G06T 7/74 |
| 2017/0176208 A1 | 6/2017 | Chung et al. | |
| 2019/0226866 A1 | 7/2019 | Chang | |

FOREIGN PATENT DOCUMENTS

| | | |
|---|---|---|
| JP | 10177638 A | 6/1998 |
| JP | 2003014477 A | 1/2003 |
| JP | 2018147393 A | 9/2018 |
| JP | 2019027965 A | 2/2019 |
| KR | 20170072480 A | 6/2017 |
| KR | 20180055158 A | 5/2018 |

OTHER PUBLICATIONS

U.S. Appl. No. 16/576,573, Advisory Action, dated Jan. 31, 2022, 5 pages.
U.S. Appl. No. 16/576,573, Final Office Action, dated Aug. 2, 2021, 16 pages.
U.S. Appl. No. 16/576,573, Final Office Action, dated Oct. 9, 2020, 17 pages.
U.S. Appl. No. 16/576,573, Non-Final Office Action, dated Feb. 6, 2020, 13 pages.
U.S. Appl. No. 16/576,573, Non-Final Office Action, dated Mar. 18, 2021, 14 pages.
U.S. Appl. No. 16/576,573, Non-Final Office Action, dated Feb. 17, 2022, 16 pages.
Gartenberg, "Google Maps is Getting Augmented Reality Directions and Recommendation Features," Available Online at: https://www.theverge.com/2018/5/8/17332480/google-maps-augmented-reality-directions-walkingar-street-view-personalized-recommendations-voting, May 8, 2018, 3 pages.
Hile et al., "Landmark-Based Pedestrian Navigation with Enhanced Spatial Reasoning," University of Washington, Nokia Research Center, George Mason University, Pervasive, 2009, pp. 59-76.
International Patent Application No. PCT/US2020/043801, International Preliminary Report on Patentability, dated Mar. 31, 2022, 8 pages.
International Patent Application No. PCT/US2020/043801, International Search Report and Written Opinion, dated Oct. 30, 2020, 12 pages.
AU2020351072, "Notice of Acceptance", dated May 2, 2023, 3 pages.
Application No. JP2022-516092, Office Action, dated Apr. 6, 2023, 9 pages.
The Chinese Patent Application No. CN202080064280.6, "Office Action", dated Jan. 27, 2023, 9 pages.
The Korean Application No. KR10-2022-7007872, "Office Action", dated Nov. 23, 2023, 16 pages.

* cited by examiner

MOBILE DEVICE NAVIGATION SYSTEM

CROSS-REFERENCES TO RELATED APPLICATION

This continuation application claims the benefit of U.S. patent application Ser. No. 16/576,573, filed on Sep. 19, 2019, the contents of which are incorporated herein by reference in its entirety for all purposes.

BACKGROUND

With mobile positioning technologies and the additional capabilities of modern mobile computing devices, these mobile devices are frequently used as mapping and navigational tools. A mobile device such as a smart phone, smart watch, or other wearable computing device may identify its current coordinates using a Global Positioning System (GPS) receiver or other mobile positioning technology, and then may use map data received from a map server to view and track its current location via a map application. Navigation capabilities also may be provided via the mobile device, in which either the mobile device and/or a server navigation component may determine a route between the current location and a selected destination. A navigation system may use optimization algorithms to select an optimal route for the user, based on road segment data, traffic data, and the user's selected mode of transportation (e.g., walking, bicycling, driving, etc.).

For mapping and navigation capabilities, mobile devices may provide a user interface displaying a variety of location and navigation data. Map user interfaces may include the user's current location, orientation, street address and nearby landmarks. A navigation user interface may provide turn-by-turn directions to the destination, and may indicate the distance and direction of the next turn. Mapping and navigation user interfaces also may support various different views, including an overhead (or bird's eye) view with map data and/or satellite images, a turn-by-turn navigation view, a street view, or the like.

However, when mobile devices support location mapping and navigation capabilities, these capabilities may be highly susceptible to any errors in the location or sensor data detected at the device. For example, even relatively small errors within the device location data, device orientation data, or device movement data, generated by the mobile device, may result in significant mapping and navigational errors, as well as user confusion and disorientation.

BRIEF SUMMARY

Techniques are described herein for generating and presenting a user interface via a mobile computing device. In various embodiments, the user interface may correspond to a map user interface and/or navigation user interface, and/or to other augmented-reality based applications which may be configured to provide geo-referenced augmented content. A mobile device, such as a smartphone, tablet computer or smartwatch, may receive data from various sensors or hardware components of the mobile device, including device location and orientation data, and image data captured by a device camera. The mobile device also may receive map information corresponding to the current location of the device, for example, from a geoservices module of a map data server. Using the image data captured at the device, the current location data, and the map information corresponding to the current location, the mobile device may determine a current orientation of the mobile device. For instance, the captured image data may be analyzed to detect street or sidewalk boundaries, buildings, landmarks, street perspective vanishing points, horizon lines, etc., and these detected objects may be compared to the corresponding local map data. In some cases, the determined orientation data may be used to update the previous device orientation readings made by an internal compass or other device orientation system. The internal compass or orientation system of the mobile device also may be reconfigured or recalibrated in some cases, based on the determined orientation. Similar techniques may be used to determine updated location data for the mobile device, to detect errors within the data provided by the mobile device's location/positioning systems, and to reconfigure or recalibrate the device's location/position systems as needed.

Additional aspects described herein relate to generating and displaying user interfaces (e.g., map and/or pedestrian navigation user interfaces) on the mobile device, using the updated device orientation and/or location data. In some embodiments, an augmented reality (AR) navigation user interfaces may be generated and rendered by overlaying a set of navigation user interface components corresponding to the current location and orientation of the device, on to current image data captured by a device camera. The AR-based user interface may be generated based on the device orientation and/or location data determined (or updated) based on analyses of the captured image data and corresponding local map data. Generating an AR-based map user interface, street view, or turn-by-turn navigation view may include generating and rendering labels (e.g., as AR overlays) onto streets, buildings, and landmarks, etc., based on the determined location and orientation data. In certain embodiments, an AR-based map user interface may be designed as a pedestrian user interface, including turn-by-turn walking navigation instructions, overlaid the current forward-facing image data captured by the device.

For example, some embodiments are directed to methods of generating a map user interface via a computing device. Such methods may include receiving, by a computing device, image data corresponding to one or more images captured by a camera of the computing device, receiving location information corresponding to a location of the computing device, receiving map information corresponding to the location of the computing device, determining an orientation of the computing device, based at least in part on (a) the image data captured by the camera of the computing device, (b) the location information corresponding to the location of the computing device, and (c) the map information corresponding to the location, generating a map user interface configured to display a current location of the computing device, and one or more user interface elements representing one or more objects within a threshold distance of the current location of the computing device, wherein generating the map user interface comprises selecting and positioning the one or more objects within the map user interface, and wherein at least one of the selecting or the positioning of the objects within the map user interface is based at least in part on the determined orientation of the computing device, and presenting the map user interface on a screen of the computing device. In additional embodiments, such methods may further include receiving a directional reading from a compass of the computing device, wherein determining the orientation of the computing device is further based at least in part on the directional reading received from the compass. Further, such methods may include reconfiguring the compass of the computing device based at least in part on the determined orientation of the computing device. In some embodiments, the location information corresponding to the location of the computing device may comprise at least one of: data received from a Global Positioning System (GPS) receiver of the computing device, data identifying one or more WiFi networks accessible to the computing device, or data identifying one or more additional devices in communication with the computing device via a short-range wireless communication protocol. In certain embodiments of such methods, the location information may correspond to the location of the computing device comprises coordinate data received from a Global Positioning System (GPS) receiver of the computing device, and the methods may further include determining updated location information corresponding to the location of the computing device, based at least in part on (a) the image data captured by the camera of the computing device, (b) the coordinate data received from the GPS receiver of the computing device, and (c) the map information corresponding to the location, and reconfiguring the GPS receiver of the computing device based at least in part on the determined updated location information. In further embodiments of such methods, determining the orientation of the computing device may further comprise analyzing the image data captured by the camera of the computing device, detecting one or more street boundaries within the image data, and comparing one or more trajectories of the one or more street boundaries, to street vector data within the received map information. In further embodiments of such methods, determining the orientation of the computing device may further include analyzing the image data captured by the camera of the computing device, and detecting a horizon line within the image data. In further embodiments, such methods may include generating a route, for the computing device, from the current location of the computing device to a second location, wherein the map user interface displays a next directional instruction based at least in part on the route.

These and other embodiments of the disclosure are described in detail below. For example, other embodiments are directed to systems, devices, and computer readable media comprising computer executable instructions to perform all methods described herein.

A better understanding of the nature and advantages of embodiments of the present invention may be gained with reference to the following detailed description and the accompanying drawings.

DETAILED DESCRIPTION OF THE DISCLOSURE

Aspects of the present disclosure provide various techniques (e.g., methods, systems, devices, computer-readable media storing computer-executable instructions used to perform computing functions, etc.) for using image data captured via the cameras of a mobile device, as well as local map data (e.g., map tiles received from a map server or geoservices module), to determine an orientation and/or precise location for the mobile device. In some cases, the determined orientation data and location data may be used to update the previous device orientation readings or device location determinations made by the internal orientation or location/positioning systems of the device. The internal orientation or location/positioning systems of the mobile device also may be reconfigured or recalibrated in some cases based on the updated orientation and location readings.

Additional aspects of the present disclosure provide techniques for generating and displaying map and navigation user interfaces on the mobile device, using the updated device orientation and/or location data. In some embodiments, an augmented reality (AR) navigation user interfaces may be generated and rendered by overlaying a set of navigation user interface components corresponding to the current location and orientation of the device, on to current image data captured by a device camera.

Figure 1:
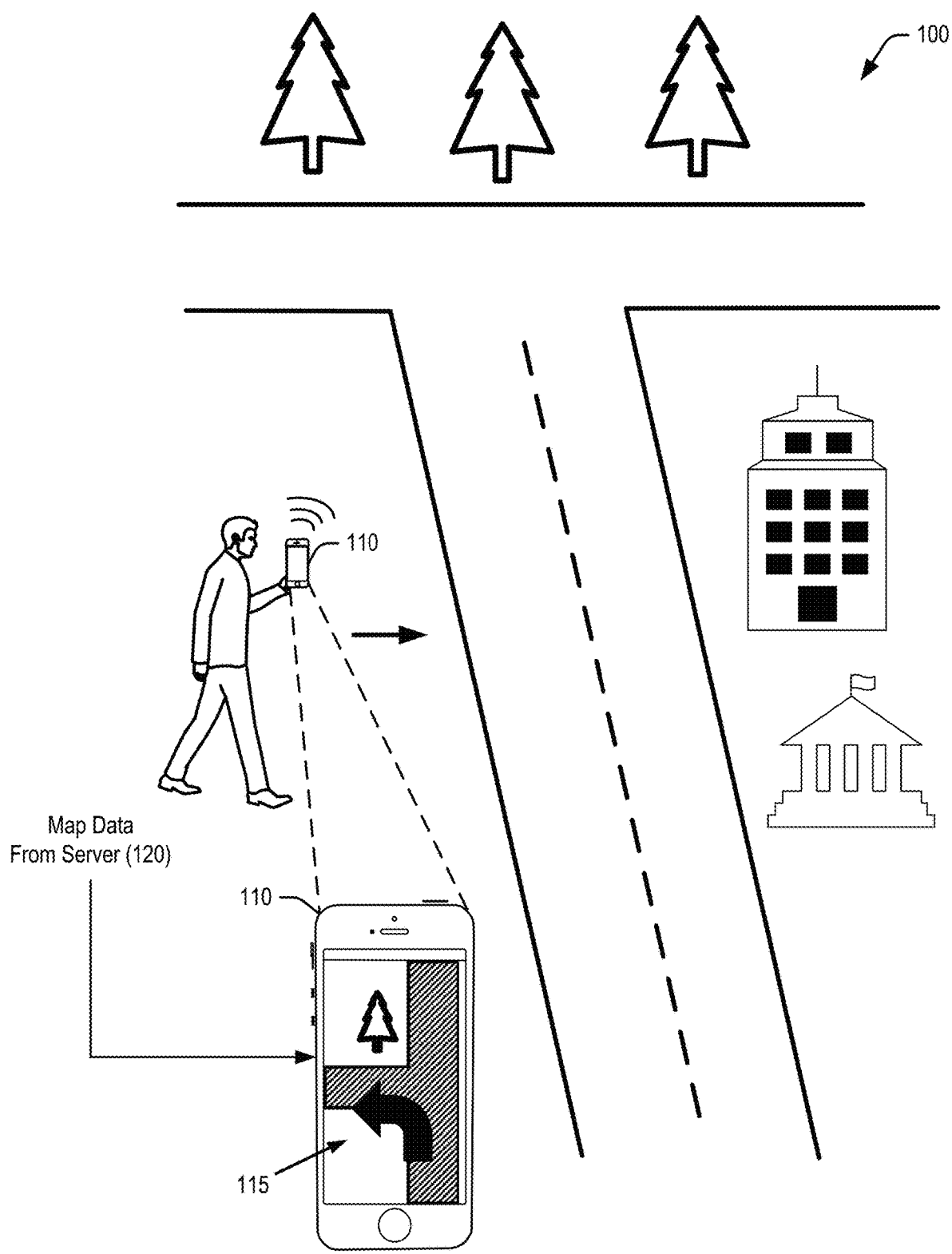
FIG. 1 is a diagram illustrating a mobile device of a pedestrian displaying a navigation user interface according to embodiments of the present disclosure.

FIG. 1 is a diagram illustrating a mobile device of a pedestrian displaying a navigation user interface according to certain embodiments of the present disclosure. In this example, a pedestrian user is holding a mobile device 110 which is currently displaying a user interface 115 of a mobile navigation application. Although a simplified user interface 115 is shown in this example for clarity, the mobile navigation application may display map and navigation graphical user interface components, such as a map of the general area near the user, including nearby streets, buildings, and landmarks, and an identification of the user's current location on the map. Embodiments described herein may apply both to map view user interfaces (e.g., showing the user's current location on a map) as well as to navigation user interfaces (e.g., showing the user's current location, a selected destination, and/or directions guiding the user to the location). Mobile map applications (which also may be referred to as mobile navigation applications when configured with navigation functionality) may retrieve map data from a map data store in a remote map server 120. The mobile map and/or navigation application may display map elements (e.g., streets, buildings, landmarks, etc.) as graphical components and geometric shapes, and/or by using actual image data within the map displayed in the user interface. For example, the mobile navigation application may be configured to receive and display satellite image data or previously captured street view image data for the map rendering. In other examples, the mobile navigation application may be configured to display an augmented reality user interface, in which real-time image data is captured via a camera on the mobile device 110, and is overlaid with labels and other graphical components to provide the navigation functionality to the user. The mobile navigation application also may support different user interface views for the user while being guided to a destination, such as an overhead (or bird's eye) view, a turn-by-turn navigation view, a street view, and an augmented reality view.

In this example, the mobile navigation application shown in FIG. 1 may be configured as a pedestrian navigation system, which may differ from vehicle-based navigation systems in several ways. For example, certain vehicle-based navigation systems might not detect or use the orientation of the device to generate the user interface display. Instead, a vehicle-based GPS navigation system, or a smartphone executing a "vehicle mode" of a mobile navigation application, may assume that the orientation of the display should correspond to the direction of travel of the vehicle. Therefore, if a smartphone executing a "vehicle mode" of a mobile navigation application is turned around while the vehicle is moving forward, the user interface need not be rotated to reflect the change in orientation of the device. However, in the pedestrian navigation system shown in FIG. 1, a change in orientation of the mobile device 110 may indicate that the pedestrian has turned or changed directions, and thus the user interface 115 should be changed to reflect the new device orientation.

Additionally, unlike certain vehicle-based navigation systems, the current location of the mobile device 110 in a pedestrian navigation system cannot be assumed to be on a road or highway, or even on a sidewalk or path. Thus, a pedestrian navigation system may generate different displays for the user interface 115 based on even small difference in the location of the mobile device 110. For instance, the pedestrian navigation system may display different data within the user interface 115 depending on which side of the street the user is walking, or when the user is cutting through a parking lot, path, or field, etc.

Pedestrian navigation systems also might not assume that the user is at street level, but instead may detect when a user is below or above street level (e.g., in a subway tunnel, on a balcony or roof), when generating the user interface 115. Thus, in certain embodiments, a pedestrian navigation system may determine whether the mobile device 110 is a street level, above street level, or below street level, and may generate the user interface 115 accordingly.

Figure 2:
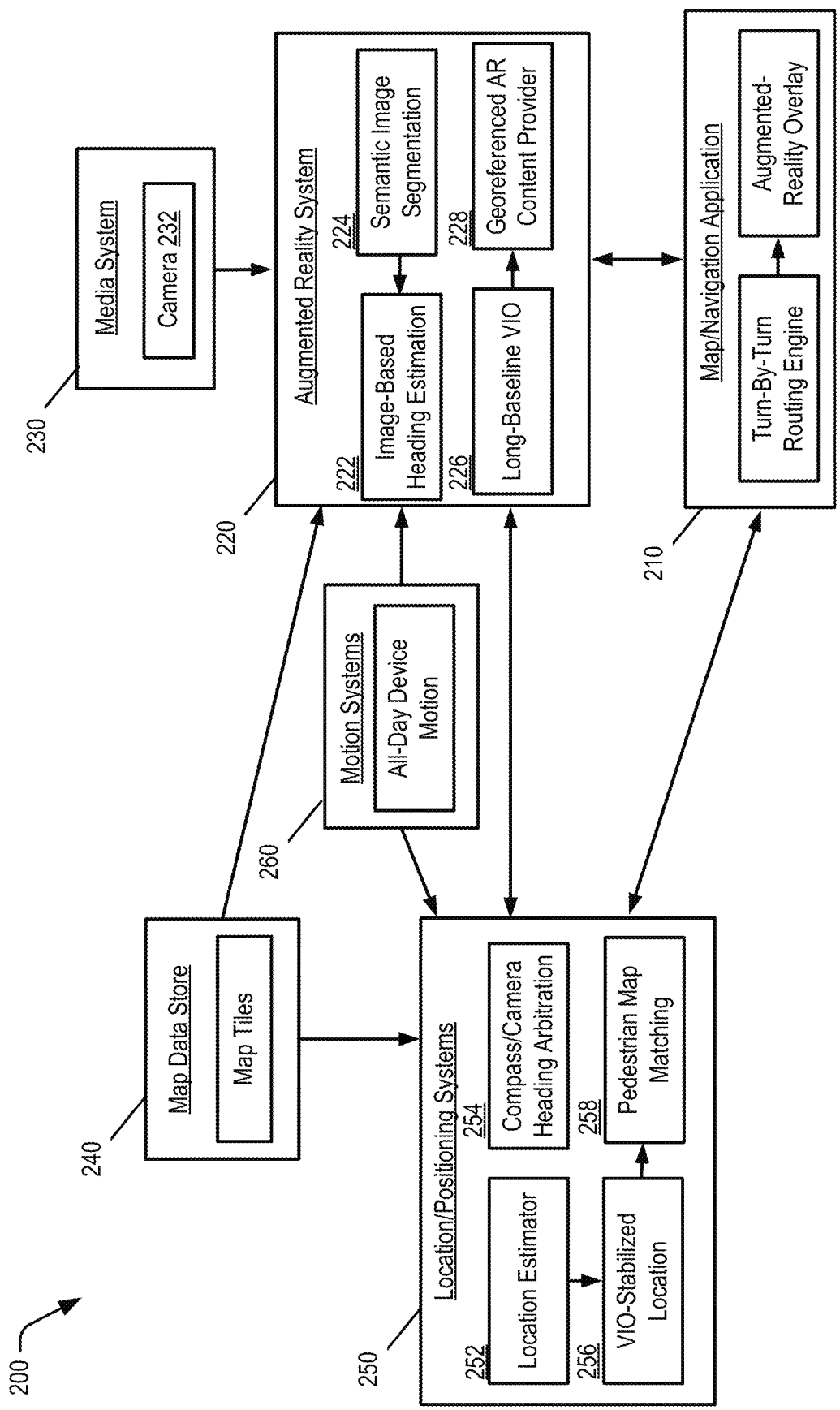
FIG. 2 is a block diagram illustrating components of a mobile device navigation system according to embodiments of the present disclosure.

FIG. 2 is a block diagram illustrating components of a mobile device navigation system according to one or more embodiments of the present disclosure. The mobile device navigation system 200 in this example may correspond to a pedestrian navigation system configured to provide location mapping and navigation functionality to a pedestrian user via the user's mobile device 110. Navigation system 200 includes a map/navigation mobile application 210, an augmented reality system 220, a media system 230, a map data store 240, a location system (or mobile positioning) system) 205, and a motion system 260. The different components and systems 210-260 of the mobile device navigation system 200 may be implemented within a mobile device 110, within a computer server 120, and/or within one or more third-party systems as described herein. For example, in some embodiments, the mobile application 210, augmented reality system 220, media system 230, location system 250, and motion system 260 may be implemented within the user's mobile device 110, and the map data store 240 may be provided by a server 120.

The map/navigation application 210 may correspond to a mobile application installed on the user's mobile device 110. Application 210 may be configured to display map data and provide various location mapping and navigation functionality via a user interface 115. For example, in response to application 210 being opened or started on the mobile device 110, application 210 may display a map user interface with elements corresponding to the user's current location, and provide directions to selected destinations. In some embodiments, the map/navigation application 210 may be configured to provide an augmented reality (AR) user interface in which map/navigation components are generated and overlaid on real-time image data is captured via a camera on the mobile device 110. Thus, application 210 may include a turn-by-turn routing engine, and an augmented reality overlay component as shown in this example.

The augmented reality system 220 may include components configured to generate the map/navigation components to be overlaid within an AR navigation user interface on the mobile device 110. In this example, the augmented reality system 220 includes a semantic image segmentation component, an image-based heading estimation component, a long-baseline Visual Inertial Odometry (VIO) component, and a georeferenced AR content provider.

Media system 230 includes one or more device cameras that capture image data for use in the AR navigation user interface. The AR system 220 may transmit requests to the media system 230 to activate a front-facing camera of the mobile device 110 during time periods when the map/navigation application 210 is in use and configured to display an AR navigation interface. During these time periods, media system 230 may activate the front-facing camera continuously, and provide the captured image data to the AR system 220 for use in the AR navigation user interface.

Map data store 240, which may be implemented within a map server 120 separate from the mobile device 110, includes a database of map tiles. Map tiles contain sets of object identifiers, properties, and geographic coordinates that represent physical objects (e.g., buildings, streets, natural landmarks, etc.) within a particular region. The AR system 220 may request the appropriate map tiles based from the map data store 240 based on the current position of the mobile device 110 when the map/navigation application 210 is in use.

Location/positioning system 250 may be configured with one or more location subsystems configured to determine the location and orientation of the mobile device 110. In this example, location/positioning system 250 includes a location estimator, a VIO-stabilized location component, a compass/camera heading arbitration component, a pedestrian map matching component. The location/positioning system 250 may be configured to provide device location data when requested by the map/navigation application 210. In some cases, the device location system 250 may include a GPS receiver or other mobile positioning technology configured to detect current geographic coordinates for the mobile device 110. Additionally or alternatively, the location/positioning system 250 may be configured to detect a wireless network, wireless access point, and/or other nearby devices (e.g., known Bluetooth devices, NFC tags, etc.) from which the location of the mobile device 110 may be determined.

Location/positioning system 250 also may determine the current device orientation in response to requests from the map/navigation application 210. In some cases, device orientation may be determined by an internal compass of the mobile device 110. In other cases, device orientation may be calculated using triangulation, by detecting differences in arrival time of a signal at different antennas of mobile device 110.

Motion system 260 may include motion sensors such as an accelerometer and gyroscope. In some embodiments, motion system 260 may be configured to provide device motion data to the AR system 220, and/or to the location/positioning system 250. For example, motion data may be provided from the motion system 260 to the AR system 220, to be used by the AR system 220 in generating the AR content. Additionally, the motion system 260 may be used to detect device location and/or device orientation, based on motion sensors such as an accelerometer and gyroscope within the mobile device 110. For example, assuming that an initial location or orientation of the mobile device 110 is known, monitoring and tracking of device acceleration data and/or gyroscopic data in three dimensions may allow the mobile device 110 to compute an updated location or updated orientation.

Figure 3:
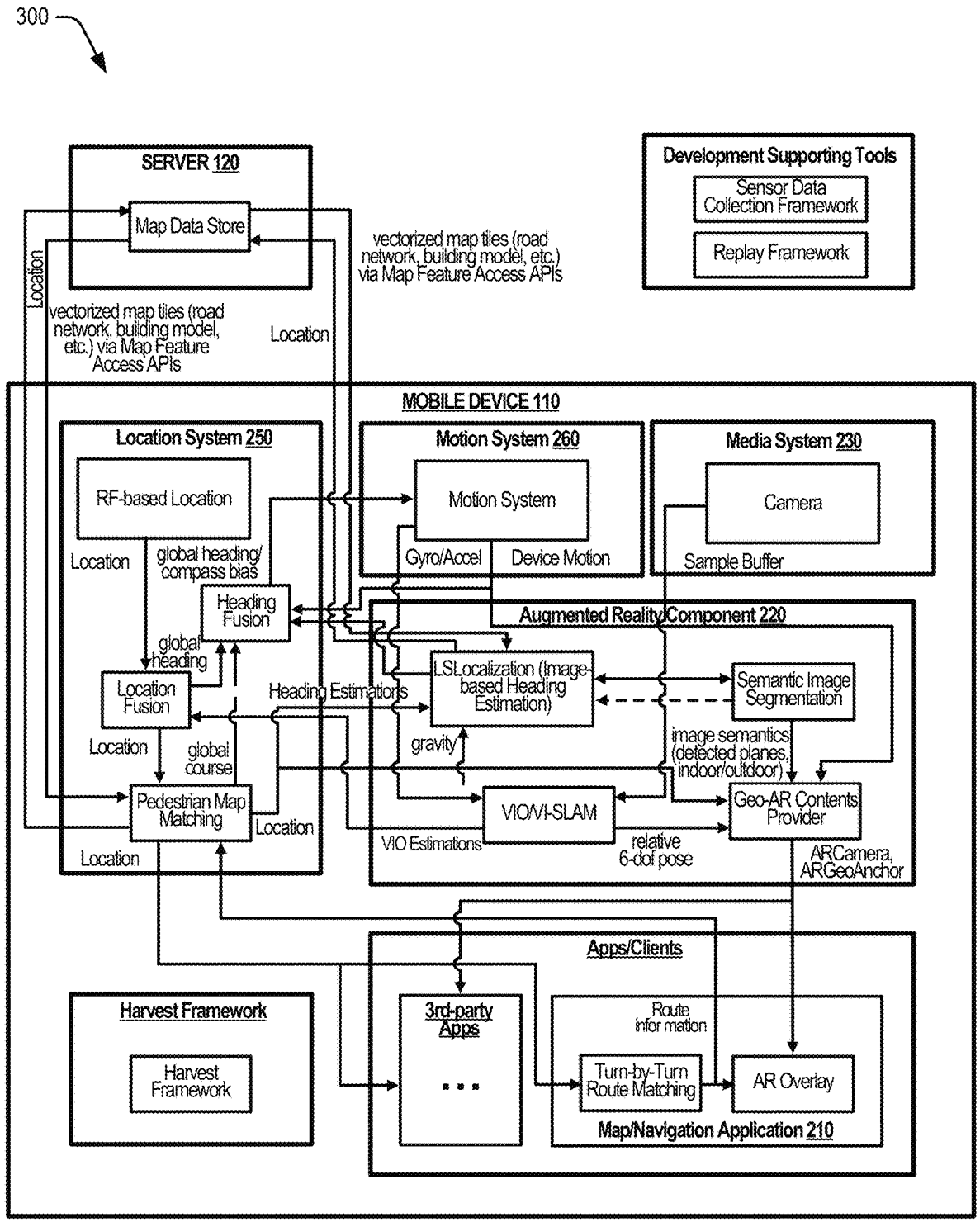
FIG. 3 is another block diagram illustrating interfaces and components of a mobile device navigation system according to embodiments of the present disclosure.

FIG. 3 is another block diagram illustrating interfaces and components of a mobile device navigation system according to embodiments of the present disclosure. The mobile device navigation system 300 shown in this example may be similar or identical to the navigation system 200 discussed above, with additional details showing further components and communication paths between the systems and components. In other embodiments, mobile device navigation system 300 may correspond to a separate implementation of a pedestrian navigation system, different from navigation system 200.

Figure 4:
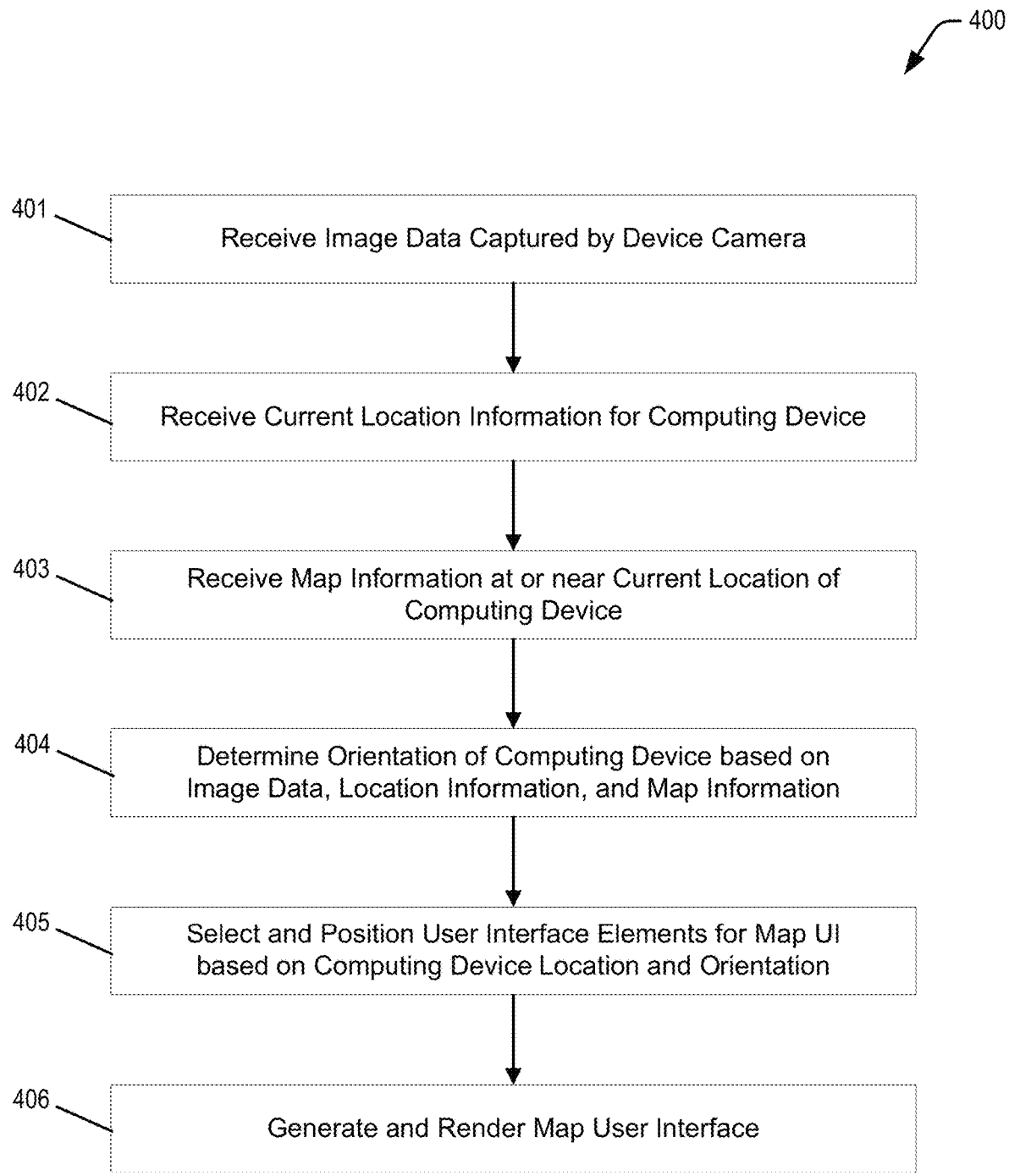
FIG. 4 is a flowchart illustrating a method for generating and displaying a navigation user interface via a mobile computing device according to embodiments of the present disclosure.

FIG. 4 is a flowchart illustrating an example process of generating and displaying a navigation user interface via a mobile computing device according to embodiments of the present disclosure. As described below, the steps in this process may be performed by a user device 110, such as smartphone or other mobile device executing a mobile device navigation system. Accordingly, the features and functionality may be described with reference to the devices and systems described above in FIGS. 1-3. However, it should be understood that processes of generating and displaying navigation user interfaces described herein are not limited to the specific computing environment and systems described above, but may be performed within various other computing environments and systems.

In step 401, the mobile device navigation system 200 receives imaged data captured by one or more cameras 232 of the mobile device 100. In some embodiments, the capturing of image data in step 401 may be performed in response to the user launching or initiating the mobile navigation application 210. For instance, the mobile application 210 or augmented reality system 220 may be configured to activate one or more device cameras in response to the mobile application 210 being opened or launched, or in response to a user action (e.g., a user initiating a pedestrian navigation mode) via the user interface of the mobile application 210. In other examples, the device camera(s) may be configured to continuously capture data during the operation of the mobile device 110, in which case a continuous stream of image data may be received by the AR system 220, prior to mobile application 210 being opened or launched by the user.

The image data received in step 401 may correspond to digital images and/or video data captured via one or more cameras of the mobile device. It may be advantageous in some cases to maximize the amount of image data received in step 401. As discussed below, maximizing the amount of image data collected in step 401 may allow the objects represented in the image data to be more readily matched with corresponding map data, and also may provide more image data overall to analyze when determining device orientation and/or location. Accordingly, in some embodiments, receiving the image data in step 401 may include activating multiple cameras on the mobile device 110, such as a front-facing camera, a user-facing camera, and/or any other available cameras to maximize the amount of image data collected. Wide-angle or panoramic camera modes also may be used in some cases, in order to increase the angles from which the image data collected in step 401. Additionally, in some embodiments, the image data received in step 401 may be collected by one or more separate computing devices at the same location, and then transmitted to mobile device 110. For example, a navigation system executing on a user's first mobile device 110 (e.g., a smartphone), may activate cameras on one or more of the user's other devices, such as a second smartphone, a smart watch, or other wearable device having a camera, etc. The other user devices thus may collect additional image data, and may transmit the image data back to the first mobile device 110 that is executing the navigation system.

In step 402, the mobile device navigation system 200 may receive and/or determine current location data for the mobile device 110. In some embodiments, the mobile device 110 may activate an internal Standard Positioning Services (SPS) receiver, such as a GPS receiver or other mobile positioning system, in response to the user opening or activating the map/navigation mobile application 210. One or more SPS receivers on the mobile device 110 may be capable of receiving signals from one or more SPS satellites using an SPS antenna. In various embodiments, an SPS receiver on the mobile device 110 may support measurement of signals from the space vehicles (SVs) of an SPS system, such as a Global Navigation Satellite System (GNSS) (e.g., Global Positioning System (GPS)), Galileo, GLONASS, Quasi-Zenith Satellite System (QZSS) over Japan, Indian Regional Navigational Satellite System (IRNSS) over India, Beidou over China, or the like. Moreover, the an SPS receiver may be used with various augmentation systems (e.g., a Satellite Based Augmentation System (SBAS)) that may be associated with or otherwise enabled for use with one or more global or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), or the like. Thus, as used herein an SPS may include any combination of one or more global or regional navigation satellite systems or augmentation systems, and SPS signals may include SPS, SPS-like, or other signals associated with such one or more SPS.

Other techniques for receiving the current location of the mobile device 110 in step 402 may include determining a current device position based on the device's connections to one or more additional devices via short-range wireless communication protocols, including any wireless networks and/or wireless access points to which the mobile device 110 is currently connected. For instance, during use of the map/navigation mobile application, the mobile device 110 may be connected to one or more wireless networks through one or more wireless access points or other network components. Wireless access points may include devices such as wireless routers, modems, switches, mobile hotspots, set-top boxes, and the like, which allow mobile devices 130 to connect and communicate wirelessly to Local Area Networks ("LANs"), Wide Area Networks (WANs). Certain wireless networks and/or wireless access points may be associated with certain geographic locations (e.g., homes, workplaces, merchant-provided WiFi networks, etc.), and thus the mobile device 110 may determine its current geographic location based on the set of wireless networks and wireless access points that are currently available for connection by the mobile device 110.

The various techniques used in step 402 for determining the current location of the mobile device 110 may have different levels of accuracy and reliability. For example, GPS Standard Positioning Services (SPS) and GPS Precise Positioning Services (PPS) may provide different levels of accuracy, and the accuracy of receivers for either standard may be influenced by signal issues and satellite line-of-sight obstructions, measurement biases, and random errors. Additionally, determining a location of the mobile device 110 based on the wireless networks and wireless access points detected by the mobile device 110 may be less precise than using GPS in some embodiments. For example, a signal from a known wireless access point might only allow for positioning of the mobile device 110 within several hundred feet, depending on the transmission range of the wireless access point. Accordingly, it should be understood that the various steps below may be customized based on the accuracy and reliability of the location determination in step 402. For example, larger geographic ranges of map information may be retrieved (step 403) when the location determination in step 402 is less precise or more likely to be error prone.

In step 403, the mobile device navigation system 200 may receive map information for the region at or near the current location of the mobile device 110. In some embodiments, a location/positioning system 250 of the mobile device 110 may request map information (e.g., one or more map tiles) from a map server 120, corresponding to the current location and nearby areas of mobile device 110. The map server 120 may include one or more map data stores 240, storing a catalog of map tiles or other map data files/structures representing different map regions. In some cases, a single map tile may represent a one square kilometer area of land. In some cases, the map information (e.g., one or more map tiles) may be retrieved in step 403 in response to a user opening or initiating a map/navigation application 210 on the mobile device 110. In other cases, the location system 250 may be configured to periodically or continuously track the current location of the mobile device 110, and to request new surrounding map information from a map server 120 as needed.

The map information received in step 403 may include map tiles, or other similar formats of map data files or structures, which include sets of geographic coordinates identifying the physical objects within the region covered by the map tile. For example, a map tile covering a particular region may include coordinate data that defines the precise size, shape, and boundaries for all streets, paths, buildings, natural or man-made landmarks, and other any fixed objects within the region. In addition to geographic coordinates, map tiles also may contain data identifying each unique object and its type (e.g., street, path, building, bodies of water, other natural landmarks, etc.), object names or labeling data, and other object properties. The map tiles or other map information received in step 403 may include any and all data needed by a map/navigation application 210 to render a map graphical user interface of the region.

Additionally or alternatively, the map information received in step 403 may include image data for or near the current location of the mobile device 110. For example, the location system 250 may retrieve satellite image data or previously captured street view image data, from one or more external servers 120 corresponding to the current location and surrounding areas. In another example, the map information received in step 403 may include catalog of physical object images (e.g., buildings, landmarks, etc.), along with the known geographic coordinates of the physical objects. As discussed below in more detail, the map information received in step 403 may be analyzed and compared to the image data captured at the mobile device 110. Thus, when non-image map information (e.g., a map tile) is received in step 403, the comparisons to the captured image data may be based comparison of object sizes, shapes, etc. However, when map image data is received in step 403, the comparisons to the image data captured at the mobile device 110 may include image-matching, etc.

In some embodiments, map information may be received from the map server 120, without ever providing the map server 120 the precise location of the mobile device 110. For example, the location/positioning system 250 of the mobile device 110 may request and receive one or more map tiles that cover a relatively large area, without ever transmitting the location coordinates of the mobile device 110 to the map server 120. Such embodiments may provide technical advantages with respect to protecting privacy and security, including completely supporting the map/navigation functionality described herein (e.g., pedestrian navigation systems, AR-based map/navigation user interfaces, etc.) without requiring the mobile device 110 to transmit its location to any external server 120.

In step 404, the mobile device navigation system 200 may determine a current orientation of the mobile device 110, based on analyses of the image data captured at the mobile device 110, the current location of the mobile device 110, and/or the map information received for the current location of the mobile device 110. In some embodiments, the orientation determination may be performed by an image-based heading estimation component 222 within an AR system 220 executing on the mobile device 110. For example, the image-based heading estimation component 222 may initially plot the current location of the mobile device 110 within the map information received in step 403. The heading estimation component 222 then may use the map information to determine one or more physical objects that are (or should be) currently nearby to the mobile device 110. The heading estimation component 222 then may compare the image data captured at the mobile device 110 in step 401, to the characteristics of the physical objects identified within the map data at or near the current location. In some embodiments, such comparisons may include analyzing the image data captured at the mobile device 110 to detect line segments, shapes, and other recognizable objects, and then comparing those objects to the nearby physical objects identified within the map data. As noted above, image-matching comparisons also may be performed, between the image data captured at the mobile device 110 and map data images (e.g., previous street view images, satellite images, image libraries, etc.) within the map information received from one or more map servers 120.

The analyses in step 404 may include detecting any discernable object within the image data captured at the mobile device 110, determining the properties of such objects, and then attempting to match the objects to the nearby physical objects identified within the map data. In various examples, the object matching may be based on object shapes, sizes, colors, relationships between objects, or any other detectable patterns within the image data.

In certain examples, the image-based heading estimation component 222 may analyze the image data captured by the mobile device 110 to detect a street, sidewalk, or walking/biking path within the capture image data. These objects may be detected by identifying parallel or near-parallel line segments corresponding to street boundaries, curbs, sidewalk lines or boundaries, and/or painted lines within streets. Based on the directions (or trajectories) of the line segments, the estimation component 222 may determine the orientation of the mobile device 110 with respect to a street, sidewalk, or path (or to a particular segment of a street, sidewalk, or path). Based on the angles or distances between the parallel or near-parallel line segments, the estimation component 222 also may determine the distance between the mobile device 110 and the street, sidewalk, or path, etc. The estimation component 222 then may identify the corresponding street, sidewalk, or path within from the map information, for example, comparing the location, direction, width, curve pattern, or other distinguishing characteristics of the street, sidewalk, or path. Finally, estimation component 222 may determine the current orientation of the mobile device 110 based on (1) the direction (or street vector) of the street, sidewalk, or path segment, which is stored within the map information, and (2) the relative orientation of the mobile device 110 to the street, sidewalk, or path segment, which may be determined by analysis of the captured image data. In some embodiments, the heading estimation component 222 also may analyze images to detect the vanishing point for parallel or near-parallel street boundaries, sidewalk lines, or railroad tracks, etc., may use the compare the direction of the vanishing point from the perspective of the mobile device 110, to the direction of the street, path, railroad tracks, etc., within the map information to determine the current orientation of the mobile device 110.

In other examples, the image-based heading estimation component 222 may analyze the image data captured by the mobile device 110 to detect buildings or other landmarks, and may compare the buildings or landmarks to the corresponding objects in the map information to determine the current orientation of the mobile device 110. For example, estimation component 222 may identify the characteristics of a nearby building or landmark (e.g., size, shape, location, or orientation), in order to match the building or landmark to the corresponding object within the map information. After matching the building or landmark to an object within the map information, the heading estimation component 222 may determine the current orientation of the mobile device 110 based on (1) the position and orientation of the object stored within the map information, and (2) the relative orientation of the mobile device 110 to the object (or at least one surface of the object) within captured image data.

In addition to matching nearby buildings or other landmarks to corresponding objects within the map information, the heading estimation component 222 also may identify distant objects within the image data captured by the device, as long as the location and/or heading of those distant objects is known or can be determined. For instance, the heading estimation component 222 may identify the sun, moon, horizon line, or other distant landmarks (e.g., a mountain, body of water, radio tower, aircraft warning light tower, etc.) within the image data captured by the mobile device 110, to determine the current orientation of the mobile device using similar techniques to those described above. Regardless of the type of physical object used to orient the mobile device 110, the steps of the process may include matching the physical object within the image data captured by the mobile device 110 to a corresponding object in the received map information, determine the absolute orientation of the object from the received map information, and then determine the current orientation of the mobile device based on the absolute orientation of object and the relative orientation of the mobile device 110 with respect to the object.

In some embodiments, data from an internal compass of the mobile device 110 also may be used in the device orientation determination in step 404. As noted above, compass data from a mobile device 110 might be inaccurate or unreliable in some cases. However, heading estimation component 222 potentially may use the compass data in a limited manner, for example, to determine the general direction where the device is pointed (e.g., within a range of 90 degrees, or 180 degrees, etc.) which may be used as a starting point for the image analysis and object comparison processes.

Although the above examples relate to determining the current orientation of the mobile device 110, similar techniques may be used to determine the current location of the mobile device 110. As noted above, the location data (or location information) received via the location/positioning system 250 of the mobile device 110 potentially may be inaccurate or imprecise. For instance, based on signal interference, erroneous readings, or design limitations of the location/positioning technologies, the current device location received in step 402 may be inaccurate by anywhere from a few feet to a half-mile or more. In these cases, the current location data determined in step 402 may be sufficiently accurate to allow the mobile device navigation system 200 to request the appropriate map tiles/map information, but might not be sufficiently accurate for the map/navigation mobile application 210.

Accordingly, step 404 also may include performing similar image processing and object comparison steps to determine the current location of the mobile device 110. For example, a location estimator 252 within location/positioning system 250 and/or within the AR system 220 may match one or more physical objects within the image data captured by the mobile device 110, to corresponding objects in the received map information. The location estimator 252 then may determine or estimate the distance between the mobile device 110 and one or more physical objects, for example, by using the size of an object and the angles between the object's edges to compute a straight line distance between the mobile device 110 and the object. The current location of the mobile device 110 may then be calculated using the absolute locations of the objects, which is stored in the map information, and the distances between the mobile device 110 and the same objects. For instance, the absolute location of the mobile device 110 may be determined by triangulation using distances to two or more objects, or based on a determined distance and orientation to one or more objects.

In certain embodiments, the mobile device navigation system 200 may use techniques similar to determining device orientation and/or location discussed above, to determine when the mobile device 110 is at street-level, above street-level, or below street-level. For example, the analysis of the image data captured by the mobile device 110 may include detecting up-angles or down-angles with respect to the physical objects nearby. When the map information confirms that those physical objects are at street level, the pedestrian navigation system 200 may determine the vertical positioning of the mobile device 110 above or below street level.

In step 405, the components of the mobile device navigation system 200 may use the determinations of the device orientation and device location in step 404, to select and positon the user interface elements to be presented via the map/navigation application 210. In some embodiments, the generation of the user interface for the map/navigation application 210 may be performed wholly by the map/navigation application 210 itself. In other embodiments, for instance, an augmented reality (AR)-based pedestrian navigation system is provided via the map/navigation application 210, then a separate AR system 220 may be used to select and positon the user interface elements to be presented via the AR-based interface.

As noted above, when the map/navigation application 210 is a pedestrian navigation application, or may be configured to operate in a pedestrian navigation mode (unlike when operating in a driving navigation mode), the orientation of the mobile device 110 may determine the display generated for the user interface. For instance, if a pedestrian using the navigation application 210 turns the mobile device 110 while staying in the same location, the user interface may be updated to display the new set of streets, buildings, and other objects that are now in front of the mobile device 110. Pedestrian navigation systems which update the display based on the orientation of the mobile device 110 may include both augmented reality (AR) navigation systems and graphical non-AR navigation systems. AR pedestrian navigation systems may display real-time image data captured from a front-facing camera of the mobile device 110, overlaid with labels and other graphical components to provide the navigation functionality to the user.

Both the selection of graphical components (e.g., graphical streets and objects, labels, direction windows, turn indicators, etc.) and the particular positioning of the graphical components may be based on the device orientation and/or location data determined in step 404. Initially, based on the device location and orientation, the app/navigation mobile application 210 and/or the AR system 220 may determine which physical objects are directly in front of and in view of the mobile device 110. For fully graphical (non-AR) user interfaces, these physical objects (e.g., streets, buildings, natural landmarks, etc.) the mobile application 210 may determine the size, location, and screen location of these components to correspond to the user's current perspective. For AR and non-AR user interfaces, labels may be generated for each physical object rendered in the user interface, and the size and placement of the labels may be selected to match the size and orientation of the rendered object. For AR-based pedestrian navigation applications, the camera image data displayed in the AR interface may analyzed to identify the particular physical objects currently shown in the image (e.g., streets, buildings, etc.), and the AR system 220 may generate object labels to be rendered onto the screen at the appropriate size, placement position, and orientation on the image of the object.

In addition to labeling the physical objects shown in the interface, the map/navigation application 210 may provide map- or navigation-related functionality with additional components, including displaying the user's current location, the destination location and anticipated time of arrival, turn-by-turn navigation instructions, etc. In some embodiments, the mobile application 210 and/or the AR system 220 may determine the size and placement of the graphical user interface components, based on the representations of the physical objects within the user interface. For example, directional instruction windows, arrows, and the like, may be positioned on the screen and sized appropriately so as not to obscure street signs, traffic signals, oncoming moving objects, etc. Additionally, the AR system 220 also may select contrasting colors to be used for labeling objects and for other user interface components to be overlaid within the AR-based pedestrian navigation user interface. For example, street and building labels, arrows, and directional instructions may be rendered in a light color during nighttime use of the pedestrian navigation system, etc.

In step 406, the map/navigation user interface may be generated and rendered by the mobile application 210 onto a display screen of the mobile device 110. As discussed above, various techniques described herein may be applied to location mapping only applications, as well as navigation applications, and for augmented reality user interfaces as well as graphical non-AR user interfaces. Accordingly, the map/navigation user interface generated and rendered in step 406 may include map-specific and/or navigation-specific user interface elements as appropriate, and may or may not be rendered as an augmented reality user interface. For instance, the techniques described herein also may be applied to any augmented reality application, to allow that application to provide geo-referenced augmented reality content.

Figure 5:
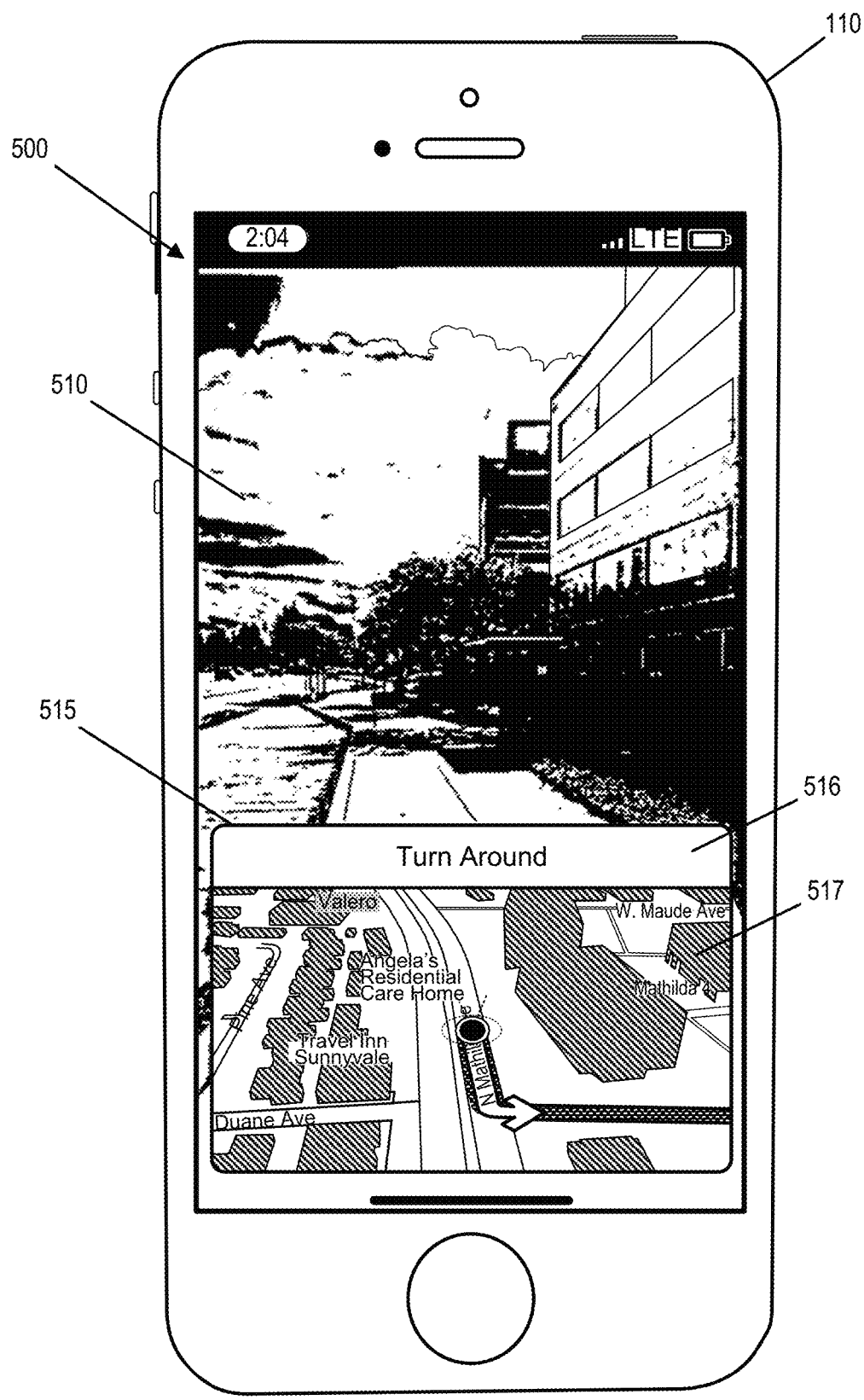
FIGS. 5-7 are diagrams showing example display screens of a navigation user interface according to embodiments of the present disclosure.
Figure 6:
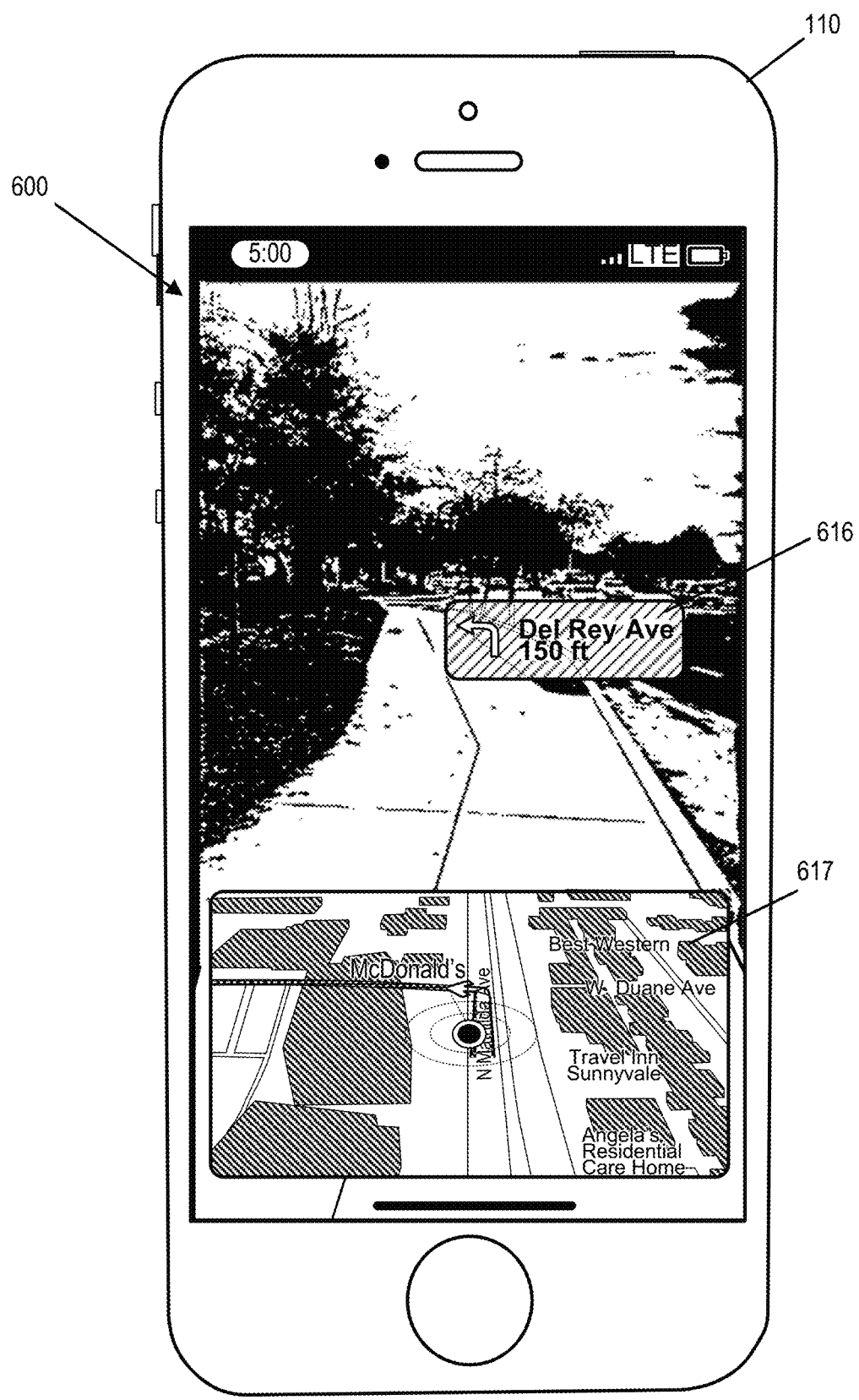
Figure 7:
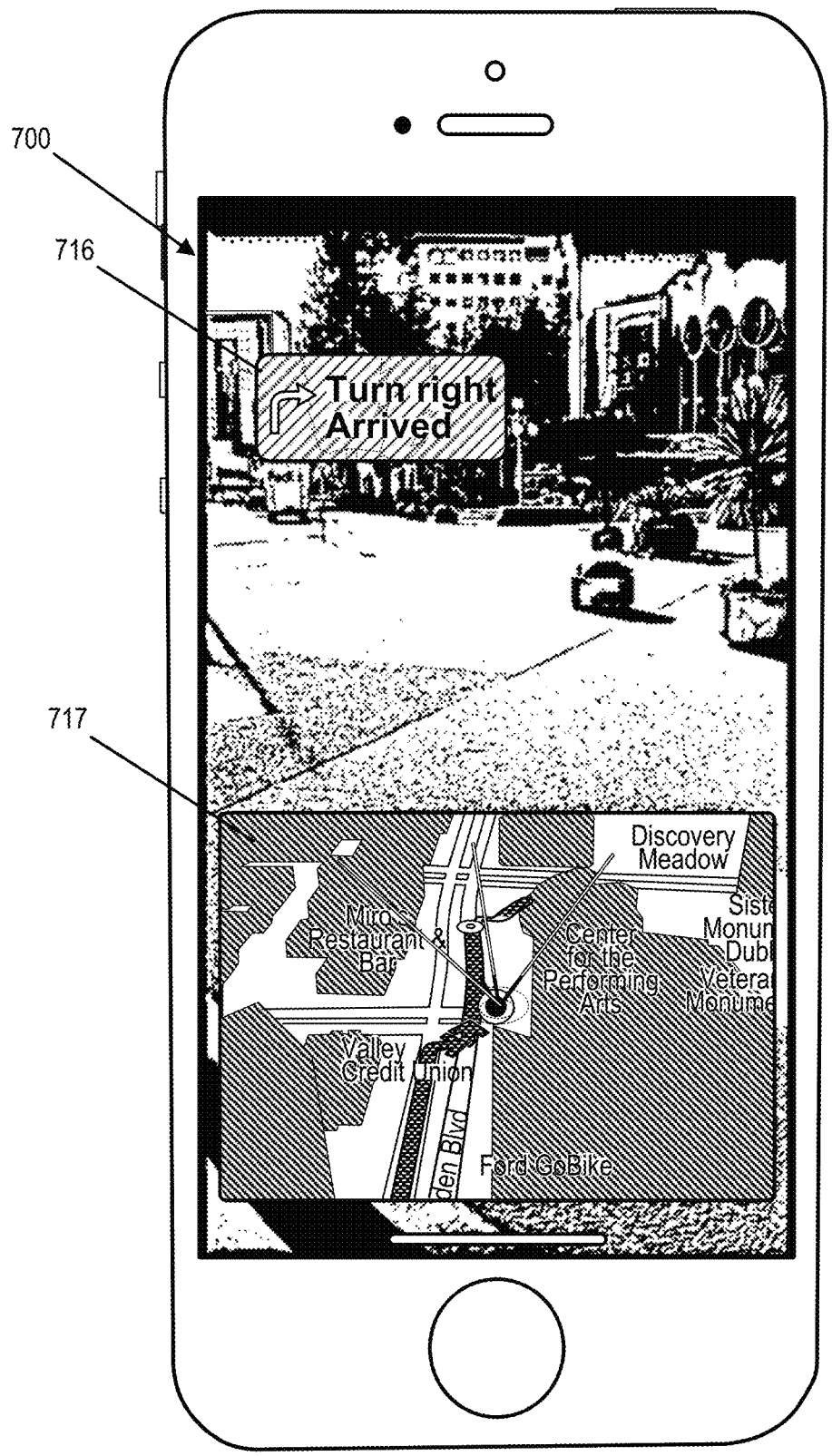

FIGS. 5-7 show three example display screens of a navigation user interface according to embodiments of the present disclosure. In FIG. 5, a mobile device 110 is shown rendering an augmented reality user interface 500 generated by a pedestrian navigation system. In this example, the augmented reality user interface 500 includes an AR window 510 displaying the real-time image data captured via the mobile device's front-facing camera, and an overlay window 515 with graphical components displaying the current directional instruction 516 for the user, and an overhead map view 517 of the user's current position and route. As shown in this example, the current directional instruction (i.e., "Turn Around") has been selected and displayed based on the user's current orientation and location. In FIG. 6, the user has turned around and the user interface 600 has been updated based on the new orientation detected for the mobile device 110. In this example, the overhead map view 617 has been updated to reflect the orientation, and the instruction to turn around has been replace with a separate graphical window 616 informing the user of the upcoming turn according to the current route. Finally, in FIG. 7, the pedestrian is approaching the destination and both the overhead map view 717 and the directional instruction window 716 have been updated accordingly.

Figure 8:
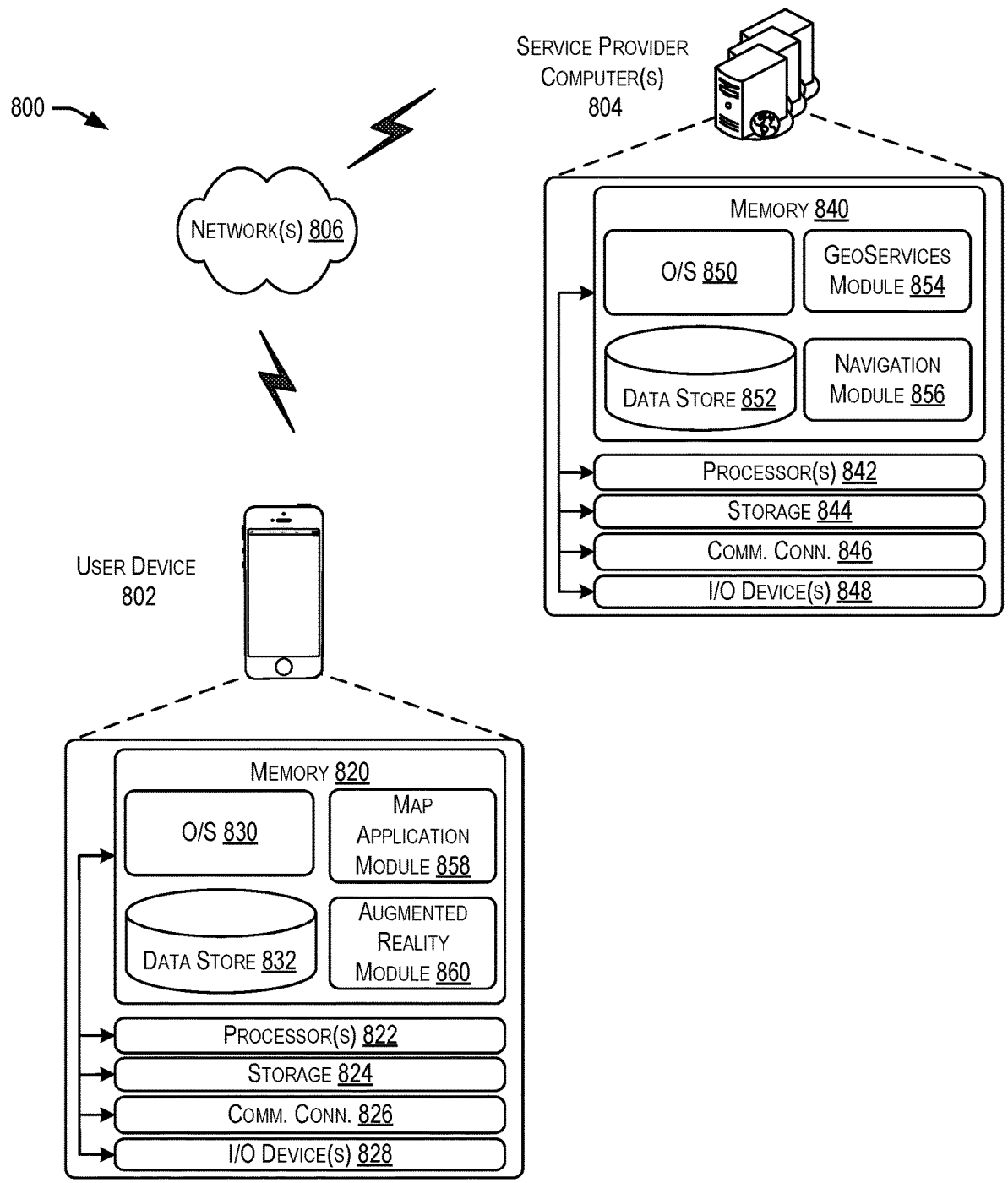
FIG. 8 is a block diagram illustrating a user device and service provider computer(s) of a mobile device navigation system according to embodiments of the present disclosure.

FIG. 8 illustrates components of a pedestrian navigation system 800 according to at least one embodiment. System 800 may include user device 802 and/or service provider computer(s) 804 that may communicate with one another via network(s) 806 utilizing any suitable communications protocol.

In some examples, the network(s) 806 may include any one or a combination of many different types of networks, such as cable networks, the Internet, wireless networks, cellular networks, and other private and/or public networks. While the illustrated example represents the user device 802 communicating with the service provider computer(s) 804 over the network(s) 806, the described techniques may equally apply in instances where the user device 802 interacts with the service provider computer(s) 804 over a landline phone, via a kiosk, or in any other suitable manner. It should be appreciated that the described techniques may apply in other client/server arrangements, as well as in non-client/server arrangements (e.g., locally stored applications, etc.). For example, in some embodiments, the geoservices module 854 and/or navigation module 856, discussed below in more detail, may operate in whole or in part on the user device 802. Additionally, the user device 802 may access the functionality of the geoservices module 854 and/or navigation module 856 through components of the user device 802 (e.g., the map application module 858), and/or the service provider computer(s) 804 via user interfaces and/or APIs provided by the geoservices module 854 and/or navigation module 856.

As noted above, the user device 802 may be configured to execute or otherwise manage applications or instructions for presenting a user interface (e.g., the user interfaces 500, 600, and 700 of FIGS. 5-7) for providing map data and pedestrian navigation data using an augmented reality overlay. The user device 802 may be any type of computing device such as, but not limited to, a mobile phone (e.g., a smartphone), a tablet computer, a personal digital assistant (PDA), a laptop computer, a desktop computer, a thin-client device, a smart watch, a wireless headset, or the like.

In one illustrative configuration, the user device 802 may include at least one memory 820 and one or more processing units (or processor(s)) 822. The processor(s) 822 may be implemented as appropriate in hardware, computer-executable instructions, or combinations thereof. Computer-executable instruction or firmware implementations of the processor(s) 822 may include computer-executable or machine-executable instructions written in any suitable programming language to perform the various functions described.

The memory 820 may store program instructions that are loadable and executable on the processor(s) 822, as well as data generated during the execution of these programs. Depending on the configuration and type of the user device 802, the memory 820 may be volatile (such as random access memory (RAM)) and/or non-volatile (such as read-only memory (ROM), flash memory, etc.). The user device 802 may also include additional removable storage and/or non-removable storage 824 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 820 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 820 and the additional storage 824, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 820 and the additional storage 824 are both examples of non-transitory computer storage media. Additional types of computer storage media that may be present in the user device 802 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the user device 802. Combinations of any of the above should also be included within the scope of non-transitory computer-readable storage media.

Alternatively, computer-readable communication media may include computer-readable instructions, program modules, or other data transmitted within a data signal, such as a carrier wave, or other transmission. However, as used herein, computer-readable storage media does not include computer-readable communication media.

The user device 802 may also contain communications connection(s) 826 that allow the user device 802 to communicate with a data store, another computing device or server, user terminals and/or other devices via one or more networks. Such networks may include any one or a combination of many different types of networks, such as cable networks, the Internet, wireless networks, cellular networks, satellite networks, other private and/or public networks, or any combination thereof. The user device 802 may also include I/O Device(s) 828, such as a touch input device, an image capture device, a video capture device, a keyboard, a mouse, a pen, a voice input device, a display, a speaker, a printer, etc.

Turning to the contents of the memory 820 in more detail, the memory 820 may include an operating system 830 and/or one or more application programs or services for implementing the features disclosed herein. The memory 820 may include data store 832 which may be configured to store map data (e.g., map tiles) and/or navigation data (e.g., turn-by-turn directions) to be used by a map application module 858 providing vehicle and/or pedestrian navigation functionality on the user device 802.

In some examples, the map application module 858 may be configured to provide the user interfaces 500, 600, and 700 at the user device 802 (e.g., at a display of the I/O Device(s) 828). As part of providing user interfaces 500-700, the map application module 858 may be configured to retrieve map tiles and/or navigation data (e.g., from data store 832), and to access an augmented reality module (e.g., AR Kit) for presenting an augmented reality overlay incorporating the map and/or navigation data within the user interfaces 500-700.

In some aspects, the service provider computer(s) 804 may be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 804 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 804 may be in communication with the user device 802 via the network(s) 806. The service provider computer(s) 804 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 804 may include at least one memory 840 and one or more processing units (or processor(s)) 842. The processor(s) 842 may be implemented as appropriate in hardware, computer-executable instructions, firmware, or combinations thereof. Computer-executable instruction or firmware implementations of the processor(s) 842 may include computer-executable or machine-executable instructions written in any suitable programming language to perform the various functions described.

The memory 840 may store program instructions that are loadable and executable on the processor(s) 842, as well as data generated during the execution of these programs. Depending on the configuration and type of service provider computer(s) 804, the memory 840 may be volatile (such as RAM) and/or non-volatile (such as ROM, flash memory, etc.). The service provider computer(s) 804 or servers may also include additional storage 844, which may include removable storage and/or non-removable storage. The additional storage 844 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 840 may include multiple different types of memory, such as SRAM, DRAM, or ROM.

The memory 840, the additional storage 844, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 840 and the additional storage 844 are all examples of computer storage media. Additional types of computer storage media that may be present in the service provider computer(s) 804 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 804. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 804 may also contain communications connection(s) 846 that allow the service provider computer(s) 804 to communicate with a stored database, another computing device (e.g., the user device 802) or server, user terminals and/or other devices on the network(s) 806. The service provider computer(s) 804 may also include I/O device(s) 848, such as a keyboard, a mouse, a pen, a voice input device, a touch input device, a display, speakers, a printer, etc.

Turning to the contents of the memory 840 in more detail, the memory 840 may include an operating system 850, one or more data stores 852, and/or one or more application programs, modules, or services for implementing the features disclosed herein, such as the features provided by the geoservices module 854 and the navigation model 856. In at least one embodiment, the geoservices module 854 may be configured to perform any operation described in connection with the geoservices models discussed above in FIGS. 2-3, including receiving and responding to requests for map data (e.g., map tiles) and/or satellite image data corresponding to geographic locations or ranges. The navigation model 856, which may be implemented within the geoservices module 854 or a separate module, may be configured to receive and respond to requests for point-to-point directions, using route optimization algorithms based on a mode of transportation (e.g., walking, bicycling, driving, etc.), map data (e.g., road segments, sidewalk, path, or trail data, etc.), current traffic conditions and historical traffic patterns, etc.

The user device 802 may be configured with a map application module 858 and an augmented reality module 860 that provides the user with an augmented reality-based pedestrian navigation system. Although not illustrated in FIG. 8, the user device 802 also may include additional underlying hardware and software components and modules to support the pedestrian navigation functionality, including locational components (e.g., GPS receiver), orientation components (e.g., compass), media components (e.g., one or more device cameras), and motion detection components (e.g., accelerometer, gyroscope, etc.). As described above, these components of the user device 802 may be used in conjunction with the map application module 858 and augmented reality module 860 to determine updated orientation data and/or location data to be used by the AR pedestrian navigation system. By way of example, a user may initiate a pedestrian navigation feature on a user device 802 (e.g., a smartphone, tablet, wearable device, etc.) with image capture functionality/hardware, location functionality/hardware, and orientation functionality/hardware. The user device 802 may capture image data, location data, and/or orientation data from these components, and analyze the data in conjunction with the map data received from the service provider computers 804. Based on analyses techniques that may be performed within the various modules of the user device 802, updated orientation data and/or location data may be determined for the user device 802. The map application 858 may provide AR pedestrian navigation functionality which based on the updated orientation data and/or location data.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art Further, as described above, one aspect of the present technology is the gathering and use of data available from various sources to improve suggestions of applications and/or people to share content from a host application. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to determine application and people suggestions for sharing content that is of greater interest to the user. Accordingly, use of such personal information data enables users to more efficiently control sharing of content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing of content objects, the present technology can be configured to allow users to select to "opt in" or "opt out" of participation in the collection of personal information data during registration for services or anytime thereafter. In another example, users may select not to provide data corresponding to their previous interactions with various applications, along with their sharing preferences and/or historical user interactions. In yet another example, users can select to limit the length of time that previous application interactions and sharing data is maintained or entirely prohibit the collection and tracking of such data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, suggestions for sharing applications and people may be selected and provided to users based on non-personal information data or a bare minimum amount of personal information, such as the content being requested by the device associated with a user, other non-personal information available to the content sharing systems, or publicly available information.

What is claimed is:

1. A method, comprising:
   determining, by a computing device, a current location of the computing device;
   receiving, by the computing device, image data corresponding to one or more images captured by one or more cameras at the current location of the computing device;
   determining one or more physical objects located near the current location from map information corresponding to the current location of the computing device;
   matching one or more objects captured within the image data with the map information, wherein matching the one or more objects captured within the image data comprises matching the one or more objects captured within the image data with the one or more physical objects located near the current location; and
   determining, by the computing device, a directional orientation of the computing device based at least in part on matching the one or more objects captured within the image data with the map information, wherein determining the directional orientation comprises determining the directional orientation based at least in part on matching the one or more objects captured within the image data with the one or more physical objects located near the current location.

2. The method of claim 1, wherein the one or more cameras comprise one or more cameras of the computing device.

3. The method of claim 1, wherein receiving the image data comprises:
   causing the one or more images to be captured by the one or more cameras in response to a mobile application being opened or launched.

4. The method of claim 1, further comprising:
   causing one or more other devices to capture at least a portion of the one or more images, and wherein receiving the image data comprises receiving the image data from the one or more other devices.

5. The method of claim 1, wherein matching the one or more objects captured within the image data with the map information comprises:
   identifying one or more line segments within the image data; and
   determining the one or more objects within the image data based on the one or more line segments.

6. The method of claim 5, wherein determining the one or more objects comprises determining one or more streets, sidewalks, or paths within the image data, and wherein matching the one or more objects captured within the image data with the map information comprises matching the one or more streets, sidewalks, or paths within the image data with one or more streets, sidewalks, or paths represented within the map information.

7. The method of claim 1, wherein matching the one or more objects captured within the image data with the map information comprises:
   identifying one or more buildings or landmarks within the image data as at least a portion of the one or more objects; and
   matching the one or more buildings or landmarks within the image data with one or more buildings or landmarks represented within the map information.

8. The method of claim 1, wherein determining the current location of the computing device comprises matching the one or more objects captured within the image data with the map information to determine the current location of the computing device.

9. One or more non-transitory, computer-readable media having instructions stored thereon, wherein the instructions, when executed by one or more processors, cause the one or more processors to:
   determine a current location of a computing device;
   receive image data corresponding to one or more images captured by one or more cameras at the current location of the computing device;
   determine one or more physical objects located near the current location from map information corresponding to the current location of the computing device;
   match one or more objects captured within the image data with the map information, wherein to match the one or more objects captured within the image data with the map information comprises to match the one or more objects captured within the image data with the one or more physical objects located near the current location; and
   determine a directional orientation of the computing device based at least in part on matching the one or more objects captured within the image data with the map information, wherein to determine the directional orientation comprises to determine the directional orientation based at least in part on matching the one or more objects captured within the image data with the one or more physical objects located near the current location.

10. The one or more non-transitory, computer-readable media of claim 9, wherein to receive the image data comprises to:
    cause the one or more images to be captured by the one or more cameras in response to a mobile navigation application being opened or launched.

11. The one or more non-transitory, computer-readable media of claim 9, wherein to match the one or more objects captured within the image data with the map information comprises to:
    identify one or more line segments within the image data; and
    determine the one or more objects within the image data based on the one or more line segments.

12. The one or more non-transitory, computer-readable media of claim 9, wherein to match the one or more objects captured within the image data with the map information comprises to:
    identify one or more buildings or landmarks within the image data as at least a portion of the one or more objects; and match the one or more buildings or landmarks within the image data with one or more buildings or landmarks represented within the map information.

13. A computing device, comprising:

memory to store image data captured by one or more cameras; and one or more processors coupled to the memory, the one or more processors to:

determine a current location of the computing device;

receive the image data corresponding to one or more images captured by the one or more cameras at the current location of the computing device;

determine one or more physical objects located near the current location from map information corresponding to the current location of the computing device;

match one or more objects captured within the image data with the map information, wherein to match the one or more objects captured within the image data with the map information comprises to match the one or more objects captured within the image data with the one or more physical objects located near the current location; and determine a directional orientation of the computing device based at least in part on matching the one or more objects captured within the image data with the map information, wherein to determine the directional orientation comprises to determine the directional orientation based at least in part on matching the one or more objects captured within the image data with the one or more physical objects located near the current location.

14. The computing device of claim 13, wherein to match the one or more objects within the image data with the map information comprises to:

identify one or more buildings or landmarks within the image data as at least a portion of the one or more objects; and match the one or more buildings or landmarks within the image data with one or more buildings or landmarks represented within the map information.

* * * * *